(12) United States Patent
Muxlow

(10) Patent No.: US 12,502,739 B2
(45) Date of Patent: Dec. 23, 2025

(54) FLEXIBLE DYNAMIC SEAL INSTALLATION TOOL

(71) Applicant: Magna Exteriors Inc., Concord (CA)

(72) Inventor: Fred H. Muxlow, Barrie (CA)

(73) Assignee: Magna Exteriors Inc., Aurora (CA)

( * ) Notice: Subject to any disclaimer, the term of this patent is extended or adjusted under 35 U.S.C. 154(b) by 547 days.

(21) Appl. No.: 17/955,976

(22) Filed: Sep. 29, 2022

(65) Prior Publication Data

US 2023/0098407 A1 Mar. 30, 2023

Related U.S. Application Data

(60) Provisional application No. 63/250,681, filed on Sep. 30, 2021.

(51) Int. Cl.
| | |
|---|---|
| *B23P 19/033* | (2006.01) |
| *B23P 19/04* | (2006.01) |
| *B25B 27/00* | (2006.01) |
| *B60J 10/00* | (2016.01) |

(52) U.S. Cl.
CPC ........... *B23P 19/033* (2013.01); *B23P 19/047* (2013.01); *B25B 27/0028* (2013.01); *B25B 27/0092* (2013.01); *B60J 10/45* (2016.02)

(58) Field of Classification Search
CPC .. B23P 19/047; B23P 19/033; B25B 27/0028; B25B 27/0035; B25B 27/0092
See application file for complete search history.

(56) References Cited

U.S. PATENT DOCUMENTS

| | | | | |
|---|---|---|---|---|
| 1,556,889 A | * | 10/1925 | Wright | B28D 1/26 |
| | | | | 173/132 |
| 6,832,428 B2 | * | 12/2004 | Miura | B60J 10/45 |
| | | | | 29/525 |

FOREIGN PATENT DOCUMENTS

| | | | |
|---|---|---|---|
| CA | 3109910 A1 | 2/2020 | |
| FR | 2660614 A | * 10/1991 | B23P 19/047 |

OTHER PUBLICATIONS

Office Action for Canadian Application No. 3,177,977 dated Apr. 24, 2024, 4-pages.

* cited by examiner

*Primary Examiner* — Tyrone V Hall, Jr.
(74) *Attorney, Agent, or Firm* — Reising Ethington P.C.

(57) ABSTRACT

An installation tool for application of a flexible dynamic seal such as weatherstrip to an end flange of a vehicle. It includes a rotary drive source to rotate a double-sided cam (could be three-sided as well) that pushes on a spring-loaded block changing the rotation into a linear back and forth motion. This spring-loaded block is attached to a plastic pad that is applied to the seal to transfer the motion on the seal and mimics the operator pushing the seal to install.

14 Claims, 4 Drawing Sheets

FLEXIBLE DYNAMIC SEAL INSTALLATION TOOL

CROSS-REFERENCE TO RELATED APPLICATIONS

This application is a Non-Provisional Patent Application and claims benefit of U.S. Provisional Patent Application No. 63/250,681, filed Sep. 30, 2021. The disclosure of the above application is incorporated herein by reference.

FIELD OF THE INVENTION

The present invention relates to an installation tool for installing an elongated seal onto an end flange of a vehicle in a limited workspace area.

BACKGROUND OF THE INVENTION

In all modern vehicles belt seals around closeable door openings are common in order to weather seal the interior of the vehicle from the elements. Therefore, end flanges are designed in these areas which will support attachment of a weather seal. These seals are typically long belts which have an elongated reinforced 'U' shaped portion which is press fit over the end flange. On the other side of the seal are various lips and bulbous portions which provide a sealing surface against a shut face on the door or the like.

All Asian OEM's (Original Equipment Manufacturers) manufacture their vehicles by installing the rear and side door seals near the end of the build process. This is done by the operators in the plant manually pushing the seal on and sliding their hand applying pressure to install. This causes operator fatigue and injury. To avoid this OEM's reduce the effort by opening the seal making it easier to install. This results in the seal not being tight to the flange causing a quality issue.

Therefore, it is desirable to provide a tool which allows seal installation at the end of the manufacturing process on vehicles without having to use manual fatigue inducing methods and without requiring the loosening of the sealing flange attachment flange.

SUMMARY OF THE INVENTION

A flexible dynamic seal installation tool for application of an elongated flexible dynamic seal to an end flange of a vehicle. It includes a rotary drive source to rotate a double-sided cam (could be three-sided as well) that pushes on a spring-loaded block changing the rotation into a linear back and forth motion. This spring-loaded block is attached to a plastic pad that is applied to the seal to transfer the motion on the seal and mimic the operator pushing the seal to install.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 3:
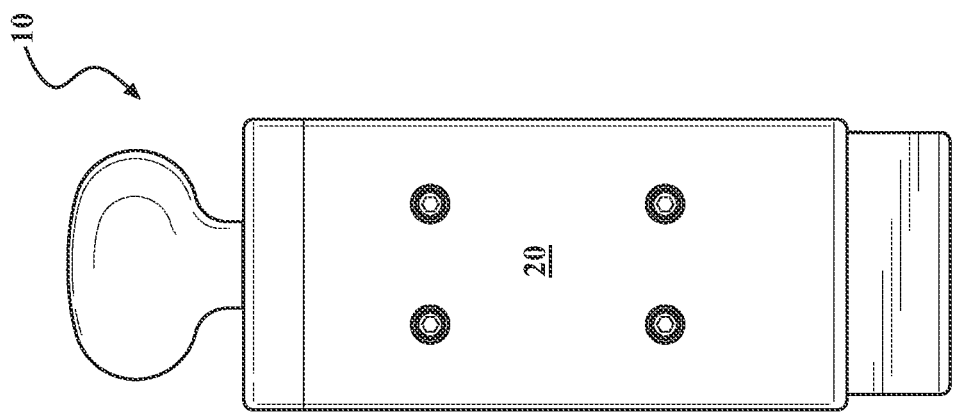
FIG. 3 is a front side view of the flexible dynamic seal installation vibratory tool of the present invention.
Figure 2:
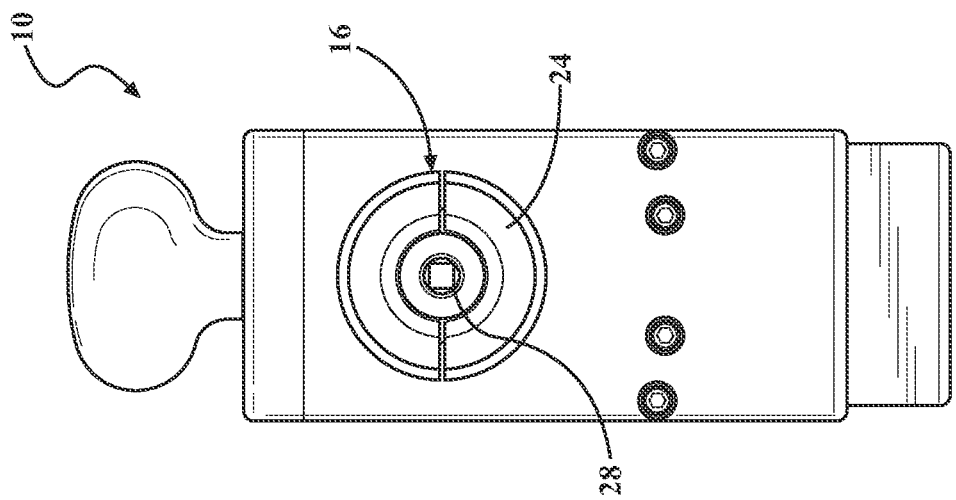
FIG. 2 is an end view of the flexible dynamic seal installation vibratory tool of the present invention showing the rotary tool engagement side.
Figure 1:
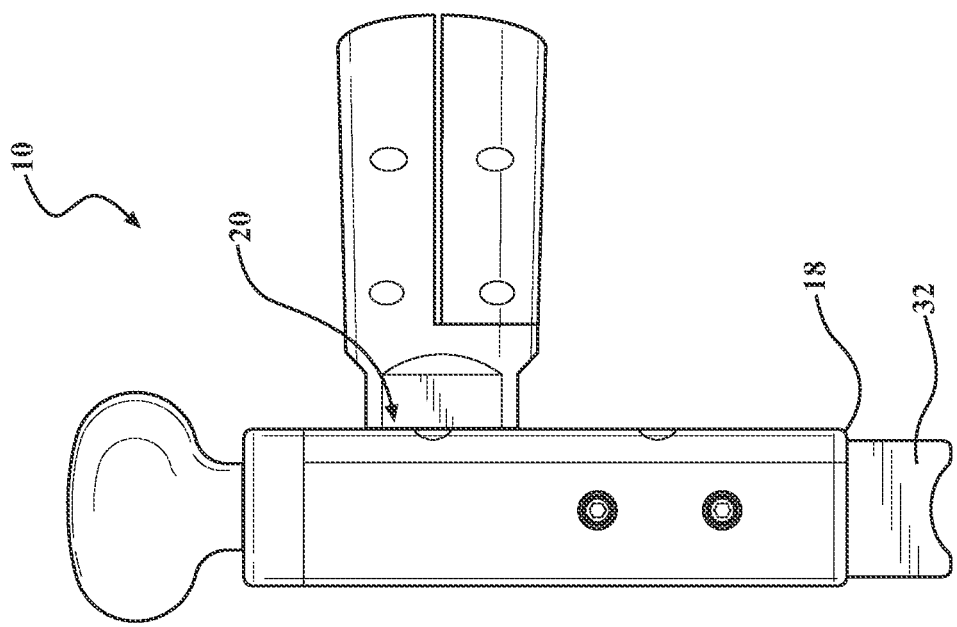
FIG. 1 is a side view of the flexible dynamic seal installation vibratory tool of the present invention.
Figure 4A:
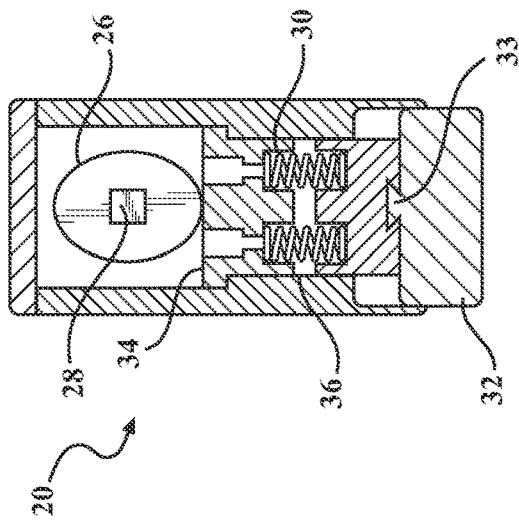
FIGS. 4A-4D are sectional views of the flexible dynamic seal installation vibratory tool of the present invention.
Figure 4B:
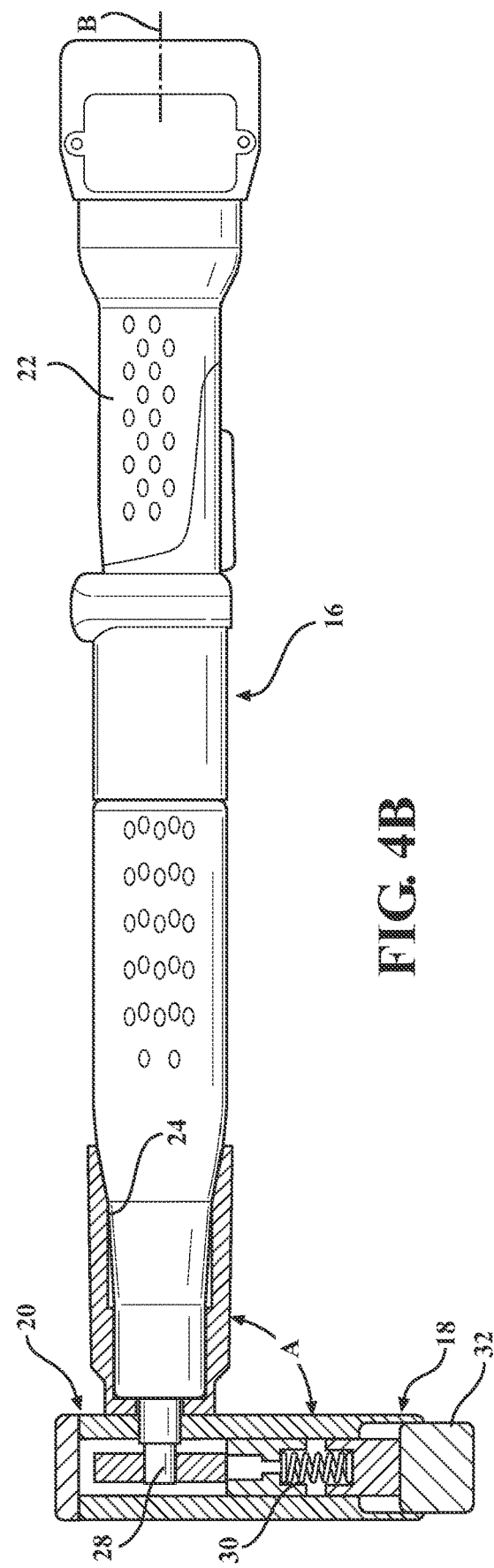
Figure 4C:
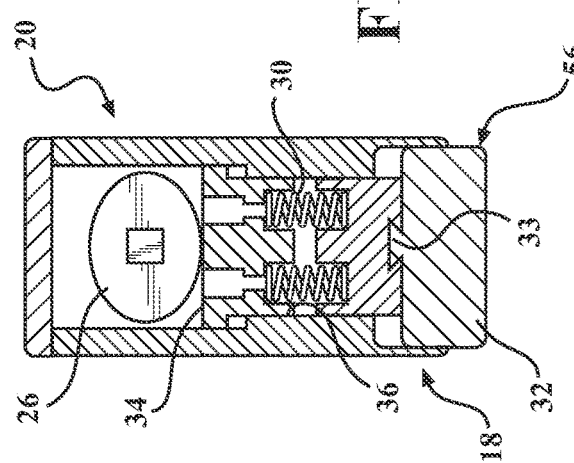
Figure 4D:
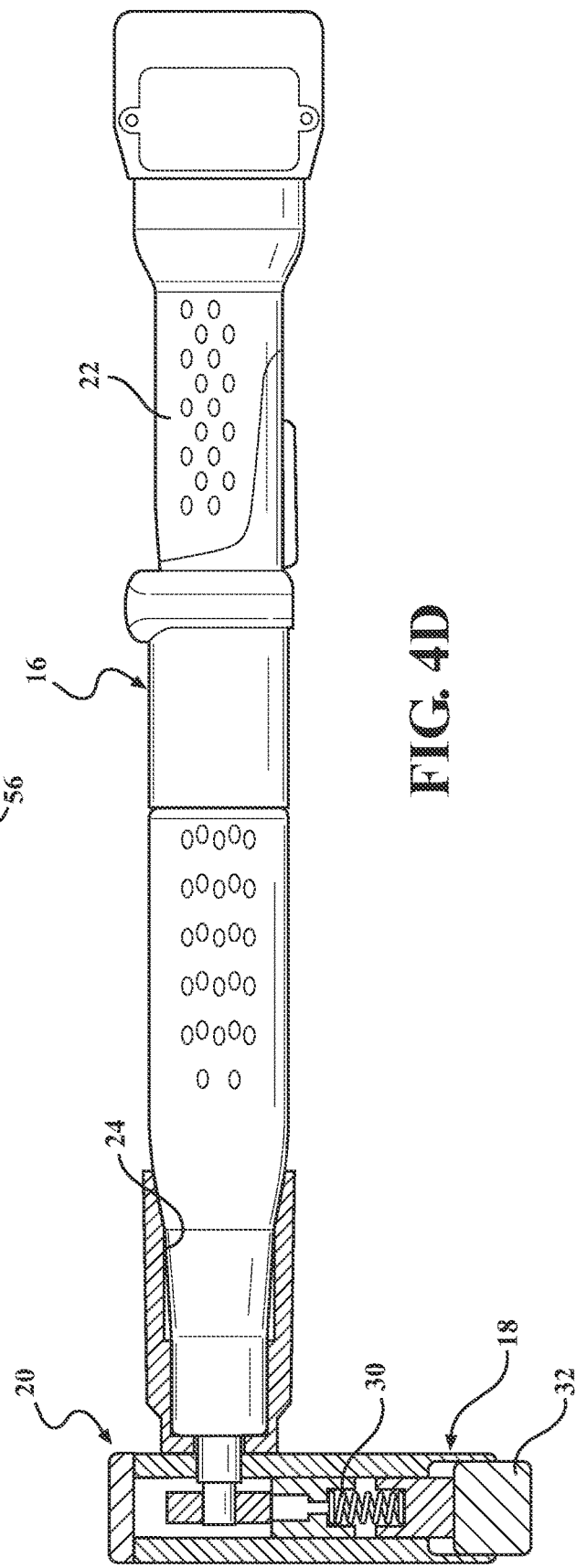
Figure 5:
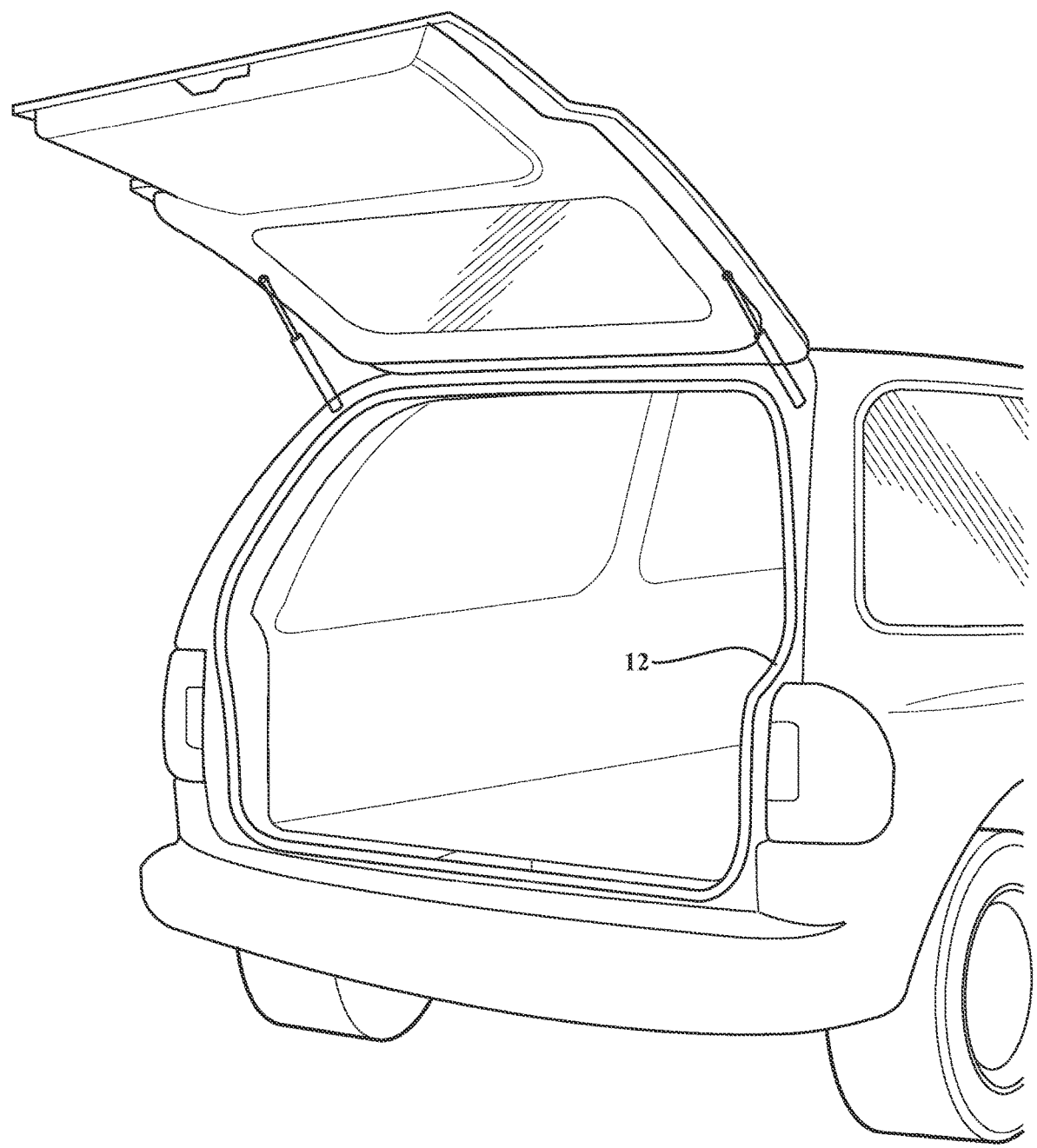
FIG. 5 is a rear view of a vehicle having a seal in which the tool of the present invention is used for applying a flexible dynamic door seal.

In accordance with the present invention there is provided a vibratory flexible dynamic seal installer tool generally shown at 10 for installation of a flexible dynamic seal such as a door seal weatherstrip or the like 12 over a flange of a vehicle 14. As shown in FIG. 5 during assembly of some vehicles the trim panels and such are installed prior to installation of the sealing members and weatherstrips. This creates a space issue wherein a crimping tool can not be utilized for crimping the seals onto the flange around a liftgate or other door, for instance. The present tool allows a direct force toward the flange while allowing the tool to slide along the belt seal for pressing the seal 12 onto the perimeter door flange of the vehicle 14.

The tool 10 generally includes a rotational drive source 16, a vibratory tool end 18, and a vibratory tool linkage assembly 20 connecting the rotational drive source 16 to the vibratory tool end 18 at an angle 'A' from an axis of rotation B-B of the rotational drive source 16. Generally, angle 'A' is from 0 to 180 degrees, typically from about 60 degrees to about 120 degrees, and preferably about 90 degrees.

The rotary tool end includes a motor assembly 22 and a connector assembly 24 this allows the rotary connection to the cam 26. A square push socket type drive connection 28 is provided for communicating the rotary drive motor assembly to the cam lobe 26. A reciprocating member 30 is biased toward engaging the cam lobe 26. Cam lobe 26 moves the reciprocating member 30 at a substantially 90 degree angle in response to rotation of the shaft along axis B-B. The reciprocating member 30 has a changeable tool pad 32 which fits into a dovetail 33 for customizing the tool to a predetermined trim piece, shape, or type. Cam lobe 26 engages the surface 34 of reciprocating member 30. Reciprocating member reciprocates up and down in the cavity 36. The cam lobe 26 has one or more lobes for causing a reciprocating motion of the reciprocating member. Preferably, the cam has two or more lobes. The rotary tool is a wireless rotational drive. However, the rotary drive is selected from pneumatic, hydraulic, cordless electric, corded electric, or flexible shaft drive.

It will be readily appreciated that the shape of the engagement end of the tool pad 32 can be circular, square, convex or concave depending on the part to be applied. Typically, materials used are non-binding materials such as nylon, Teflon, 90 durometer urethane or the like. For certain applications metals such as aluminum or steel are also used.

In operation in the present invention there is provided a battery, electric/pneumatic head that uses the drive source to rotate a double-sided cam (could be three-sided as well) that pushes on a spring-loaded block changing the rotation into a linear back and forth motion. This spring-loaded block is attached to a plastic pad that is applied to the seal to transfer the motion on the seal and mimic the operator pushing the seal to install. The drive rotating at 2000 rpm would cause the pad to move at a rate of 4000 strokes per minute creating a vibrating surface that installs the seal with less effort on the operator's part. The tool is designed to be a near universal tool that can be used in both side door and rear seal applications without modification. It can also be used in any application that requires pressure to be applied.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vibratory flexible dynamic seal installer tool for installation of a flexible dynamic seal piece over a flange comprising:
   a rotational drive source having a rotary shaft;
   a vibratory tool end; and
   a vibratory tool linkage assembly comprising a cam lobe attached to said rotary shaft and a reciprocating member engaging the cam lobe for moving the reciprocating member in response to rotation of the shaft connecting the rotational drive source to the vibratory tool end at an angle from an axis of rotation of the rotational drive source, wherein the reciprocating member has a changeable tool pad for customizing the tool to a predetermined trim piece.

2. The vibratory flexible dynamic seal installer tool of claim 1 wherein said angle 0 to 180 degrees.

3. The vibratory flexible dynamic seal installer tool of claim 1 wherein said angle is from about 60 degrees to about 120 degrees.

4. The vibratory flexible dynamic seal installer tool of claim 1 wherein the angle is about 90 degrees.

5. The vibratory flexible dynamic seal installer tool of claim 1 wherein the cam lobe has one or more lobes for causing a reciprocating motion of the reciprocating member.

6. The vibratory flexible dynamic seal installer tool of claim 5 wherein the cam lobe has two or more lobes.

7. The vibratory flexible dynamic seal installer tool of claim 1 wherein the rotary tool is a wireless rotational drive.

8. The vibratory flexible dynamic seal installer tool of claim 1 wherein the rotary drive is selected from pneumatic, hydraulic, cordless electric, corded electric, or flexible shaft drive.

9. A vibratory flexible dynamic seal installer tool for installation of a flexible dynamic seal piece over a flange comprising:
   a connection adapted to be connected to a rotational driving member;
   a vibratory tool end including a seal engaging member which is interchangeable for customizing the tool to a predetermined trim piece; and
   a vibratory tool linkage assembly connecting the rotational drive source to the vibratory tool end at an angle from an axis of rotation of the rotational drive source wherein said tool linkage assembly further comprises a cam lobe attached to a rotary shaft, including a reciprocating member engaging the cam lobe for moving the reciprocating member at a substantially 90 degree angle in response to rotation of the shaft.

10. The vibratory flexible dynamic seal installer tool of claim 9 wherein the cam has one or more lobes for causing a reciprocating motion of the reciprocating member.

11. The vibratory flexible dynamic seal installer tool of claim 9 wherein the cam has two or more lobes.

12. The vibratory flexible dynamic seal installer tool of claim 9 wherein the rotary tool is a wireless rotational drive.

13. The vibratory flexible dynamic seal installer tool of claim 9 wherein the rotary drive is selected from pneumatic, hydraulic, cordless electric, corded electric, or flexible shaft drive.

14. A method of installing an elongated flexible dynamic seal piece on an end flange comprising:
   providing a tool which has a vibratory tool, said tool comprising a connection adapted to be connected to a rotational driving member;
   a vibratory tool end including a seal engaging member which is interchangeable for customizing the tool to a predetermined flexible dynamic seal strip; and
   a vibratory tool linkage assembly connecting the rotational drive source to the vibratory tool end at an angle from an axis of rotation of the rotational drive source wherein said tool linkage assembly further comprises a cam lobe attached to a rotary shaft, including a reciprocating member engaging the cam lobe for moving the reciprocating member at a substantially 90 degree angle in response to rotation of the shaft, and
   selecting and installing a seal engaging member onto the tool for customizing the tool to said predetermined flexible dynamic seal strip and,
   forcing said flexible dynamic seal strip in a direction toward the flange and onto the flange, wherein the vibratory tool has a handle at substantially a 90 degree angle to the flange.

* * * * *